United States Patent [19]
Ullrich et al.

[11] Patent Number: 5,409,423
[45] Date of Patent: Apr. 25, 1995

[54] BELT PULLEY

[75] Inventors: Günter Ullrich, Hemsbach; Winfried Ochs, Alsbach-Haehnlein; Herwig Hönlinger, Gross Rohrheim, all of Germany

[73] Assignee: Firma Carl Freudenberg, Weinheim, Germany

[21] Appl. No.: 229,038

[22] Filed: Apr. 18, 1994

[30] Foreign Application Priority Data

Apr. 27, 1993 [DE] Germany .................. 43 13 756.3

[51] Int. Cl.6 .......................................... F16H 55/36
[52] U.S. Cl. .................................. 474/170; 474/178
[58] Field of Search .................. 474/161, 166–168, 474/170, 174, 177, 178, 190–192

[56] References Cited

U.S. PATENT DOCUMENTS

| | | | |
|---|---|---|---|
| 4,468,210 | 8/1984 | McCutchan, Jr. | 474/178 X |
| 4,473,363 | 9/1984 | McCutchan, Jr. | 474/190 X |
| 4,824,423 | 4/1989 | Jocic | 474/170 |

*Primary Examiner*—Michael Powell Buiz
*Attorney, Agent, or Firm*—Kenyon & Kenyon

[57] ABSTRACT

Belt pulley having a substantially cup-shaped profile that is delimited on one side, at least in the axial direction, by an integrally shaped-on rim flange is disclosed. The rim flange is configured as the hub ring of a torsional vibration damper; the hub ring is connected, by a damping ring made of elastomeric material, to an inertial ring.

14 Claims, 2 Drawing Sheets

BELT PULLEY

SPECIFICATION

The invention relates generally to a belt pulley with a substantially cup-shaped profile that is delimited on one side, in at least the axial direction, by an integrally shaped-on rim flange.

Belt pulleys of this general type are known and are utilized, for example, to drive accessories in motor vehicles. To allow damping of vibrations that occur, it is possible, for example, to provide a torsional vibration damper that is separately produced and fastened to the belt pulley. It must be noted in this connection, however, that the two-part configuration of belt pulley and torsional vibration damper is less than satisfactory in terms of installation procedure and economy.

There remains a need for the further development of a belt pulley of the previously known type that is easy to manufacture and install, and which possesses suitable vibration-damping properties.

SUMMARY OF THE INVENTION

According to the invention, the belt pulley comprises a pulley that is substantially cup-shaped in profile, having an inner cylindrical surface configured for attachment to a shaft, and a belt guiding surface radially displaced from the shaft to accommodate a drive belt. According to the invention, a rim flange, contiguous with the belt guiding surface, is configured for use as the hub ring of a torsional vibration damper. The hub ring in turn is connected, by means of a damping ring made of elastomeric material, to an inertial ring. It is advantageous in this regard that the torsional vibration damper is configured integrally with the rim flange. This simplifies the manufacture of the component as well as its installation, for example on an internal combustion engine. The torsional vibration damper can correspond, in its configuration, to known torsional vibration dampers; the damping ring, which is arranged between the hub and inertial rings and supports the two parts against one another in a torsionally elastic manner, can be molded in or vulcanized.

According to one advantageous embodiment, the rim flange can extend substantially in the radial direction and can be connected, on the side facing away from the belt guiding surface, to the damping ring and inertial ring. In this embodiment the axial extension of the belt pulley is only slightly greater as compared to those belt pulleys that lack torsional vibration dampers.

According to a further advantageous embodiment, the inertial ring can be made of sheet metal, and can be provided with a toroidal thickening in the region of its outer peripheral boundary. Metal sheets are easy to shape and are therefore suitable for the cost-effective manufacture of belt pulleys. The shape of the toroidal thickening and its mass depend on the particular circumstances of the application.

The thickening can be formed from the shaped sheet-metal edge of the inertial ring by crimping over the peripheral edge of the sheet.

Alternatively, the sheet-metal edge can be upset. It is advantageous in this regard that out-of-balance phenomena caused by the inertial ring are minimized during operation of the belt pulley.

The inertial ring can be angular in shape, and can be fastened along an axial projection, by means of an integrally configured and correspondingly shaped damping ring, to the interior side of the belt guiding surface. It is advantageous in this regard that the contact surface between the elastomeric material and the rim flange be relatively extensive. This helps assure that the belt pulley have consistently good operating characteristics over a long service life. A further advantage of using an inertial ring having such an L-shaped profile is that it can damp not only torsional vibrations but also vibrations occurring in the radial direction.

The damping ring can cover the end of the axial projection and be supported in the axial direction between the axial projection and the belt pulley body. In order to provide better relative rotation capability between the belt pulley body and inertial ring, the elastomeric material is preferably adhesively fastened only onto the axial projection or onto the belt pulley body. On the axially opposite side, the elastomeric material is then supported non-adhesively and slidingly. The belt guiding surface and the axial projection of the inertial ring can extend parallel to one another. The contiguous rim flange and the axially adjacent radial projection of the inertial ring delimit a gap having increasing axial width with increasing radial distance.

Subsequent to the manufacture of the belt pulley with integrated torsional vibration damper, it is possible to calibrate the hub ring and/or the inertial ring, when the damping ring is vulcanized, so as reliably to eliminate tensile stresses in the elastomeric material of the damping ring, which reduce service life. A further advantage of this embodiment lies in its provision of greater fatigue strength.

DETAILED DESCRIPTION

Figure 1:
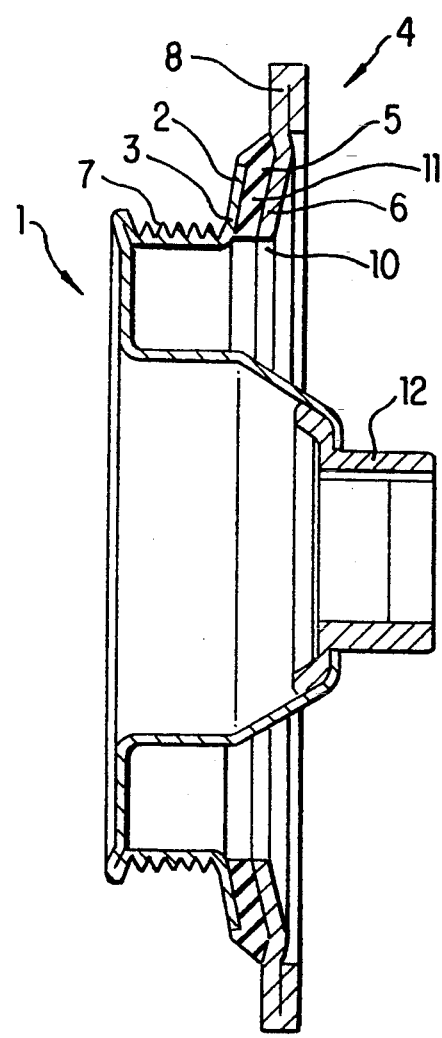
FIG. 1 is a cross-sectional view of a belt pulley constructed according to a first embodiment of the invention.
Figure 2:
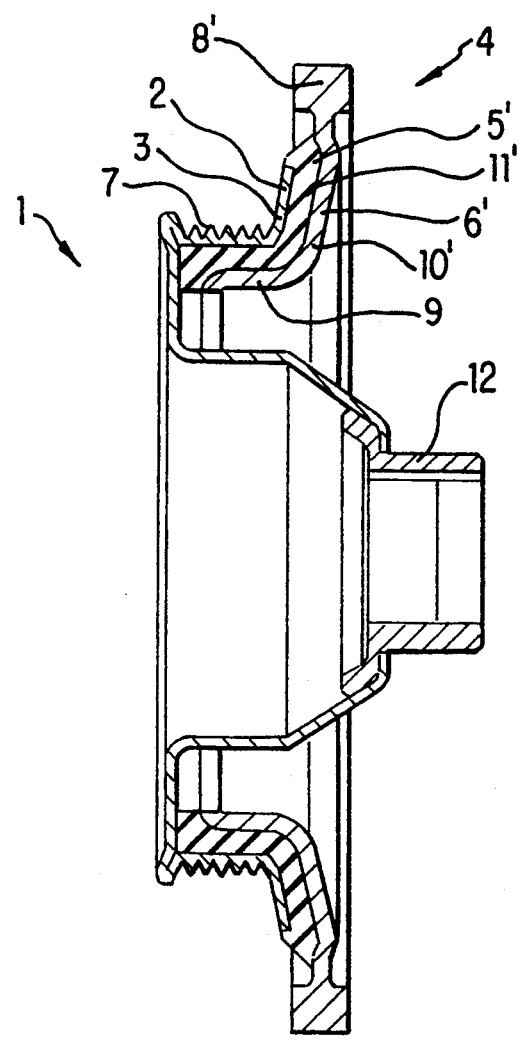
FIG. 2 is a cross-sectional view of a belt pulley constructed according to a second embodiment of the invention.

FIGS. 1 and 2 each schematically show an exemplary embodiment of a belt pulley 1 in a cross-sectioned depiction. Belt pulley 1 comprises a belt pulley body, which comprises a belt guiding surface 7 non-rotatably connected to a drive 12. Drive 12 can, by example, be the crankshaft of an internal combustion engine. In this exemplary embodiment the belt pulley body is substantially S-shaped. On the axial boundary facing drive 12, the belt guiding surface 7 of the belt pulley 1 is contiguous with a rim flange 2 that is connected integrally to the belt pulley body and which extends in the radial direction. Rim flange 2 is configured as a hub ring 3 of a torsional vibration damper 4. In this exemplary embodiment, hub ring 3 is joined adhesively to a damping ring 5 made of elastomeric material. The particular configuration of the belt guiding surface can deviate from the exemplary embodiments shown here, as can the dimensions and shape of damping ring 5 and inertial ring 6.

FIG. 1 shows a first exemplary embodiment in which damping ring 5 and inertial ring 6 extend only in the radial direction, and are substantially disk-shaped.

FIG. 2 shows a second exemplary embodiment in which damping ring 5' and inertial ring 6' have a substantially L-shaped profile.

In addition to its attachment to radial projection 10' of inertial ring 6', damping ring 5 is joined, in the region of its axial projection 9, to the inside of belt guiding surface 7.

In each embodiment, the inertial ring terminates at its peripheral portion with a thickened toroidal-like portion. The inertial ring can be made of sheet metal, which simplifies the formation of such a thickening as simple metal working techniques can be employed to that end. For example, in FIG. 1, the thickened portion 8 can be formed of the crimped over sheet-metal edge of the inertial ring. According to the embodiment of FIG. 2, the sheet-metal edge 8' can be upset.

What is claimed is:

1. A belt pulley, comprising:
   a pulley having a central longitudinal axis and a substantially cup-shaped profile;
   a rim flange integrally formed with said pulley, said rim flange delimiting one side of the pulley in at least the axial direction, said rim flange being configured to serve as a hub ring of a torsional vibration damper;
   a damping ring made of elastomeric material;
   an inertial ring, said inertial ring being connected to the hub ring via the damping ring.

2. A belt pulley according to claim 1, wherein the rim flange extends in substantially the radial direction and is connected, on the side facing away from the belt guiding surface, to the damping ring and inertial ring.

3. A belt pulley according to claim 1, wherein the inertial ring is made of sheet metal, and is provided with a toroidal thickening in the region of its outer peripheral boundary.

4. A belt pulley according to claim 3, wherein the thickening is formed as the shaped sheet-metal edge of the inertial ring.

5. A belt pulley according to claim 4, wherein the sheet-metal edge is crimped over.

6. A belt pulley according to claim 1, wherein
   the inertial ring is angular in shape and further comprises an axially extending projection; and
   the damping ring further comprises an axially extending projection in overlying corresponding relationship with the axially extending projection of the inertial ring, by which the inertial ring is linked to the side of the belt guiding surface facing the longitudinal axis of the belt pulley.

7. A belt pulley according to claim 2, wherein
   the inertial ring is angular in shape and further comprises an axially extending projection; and
   the damping ring further comprises an axially extending projection in overlying corresponding relationship with the axially extending projection of the inertial ring, by which the inertial ring is linked to the side of the belt guiding surface facing the longitudinal axis of the belt pulley.

8. A belt pulley according to claim 3, wherein
   the inertial ring is angular in shape and further comprises an axially extending projection; and
   the damping ring further comprises an axially extending projection in overlying corresponding relationship with the axially extending projection of the inertial ring, by which the inertial ring is linked to the side of the belt guiding surface facing the longitudinal axis of the belt pulley.

9. A belt pulley according to claim 6, wherein the damping ring extends over the end of the axial projection of the inertial ring.

10. A belt pulley according to claim 7, wherein the damping ring extends over the end of the axial projection of the inertial ring.

11. A belt pulley according to claim 8, wherein the damping ring extends over the end of the axial projection of the inertial ring.

12. A belt pulley according to claim 6, wherein
    the belt guiding surface of the pulley and the axial projection of the inertial ring extend generally parallel to one another; and
    the rim flange and the axially adjacent radial projection of the inertial ring delimit an axial gap that increases in the axial direction with increasing radial distance.

13. A belt pulley according to claim 6, wherein
    the belt guiding surface of the pulley and the axial projection of the inertial ring extend generally parallel to one another; and
    the rim flange and the axially adjacent radial projection of the inertial ring delimit an axial gap that increases in the axial direction with increasing radial distance.

14. A belt pulley according to claim 2, wherein the inertial ring is made of sheet metal, and is provided with a toroidal thickening in the region of its outer peripheral boundary.

* * * * *